(12) United States Patent
Chaudhari et al.

(10) Patent No.: US 12,006,442 B2
(45) Date of Patent: Jun. 11, 2024

(54) ADDITIVE MANUFACTURING OF POLISHING PADS

(71) Applicant: Applied Materials, Inc., Santa Clara, CA (US)

(72) Inventors: Atul Bhaskar Chaudhari, Mumbai (IN); Sivapackia Ganapathiappan, Los Altos, CA (US); Srobona Sen, Maharashtra (IN)

(73) Assignee: Applied Materials, Inc., Santa Clara, CA (US)

( * ) Notice: Subject to any disclaimer, the term of this patent is extended or adjusted under 35 U.S.C. 154(b) by 48 days.

(21) Appl. No.: 16/681,700

(22) Filed: Nov. 12, 2019

(65) Prior Publication Data

US 2021/0071017 A1    Mar. 11, 2021

(30) Foreign Application Priority Data

Sep. 11, 2019 (IN) .............................. 201941036561

(51) Int. Cl.
 *B33Y 70/00* (2020.01)
 *B24B 37/24* (2012.01)
 (Continued)

(52) U.S. Cl.
 CPC ............ *C09D 11/102* (2013.01); *B24B 37/24* (2013.01); *B33Y 70/00* (2014.12); *C08G 18/10* (2013.01); *C08G 18/246* (2013.01); *C08G 18/4238* (2013.01); *C08G 18/6755* (2013.01); *C09D 11/30* (2013.01)

(58) Field of Classification Search
 CPC ..... B33Y 70/00; B24B 37/24; C08G 18/6755; C08G 18/4238; C08G 18/246; C08G 18/10; C09D 11/102; C09D 11/30
 See application file for complete search history.

(56) References Cited

U.S. PATENT DOCUMENTS

| 4,507,458 A | 3/1985 | Shiraki et al. |
| 5,738,574 A | 4/1998 | Tolles et al. |

(Continued)

FOREIGN PATENT DOCUMENTS

| CN | 102051088 | 5/2011 |
| CN | 103072099 | 5/2013 |

(Continued)

OTHER PUBLICATIONS

Ando et al., "Synthesis of polymer materials by low energy electron beam. I. Polyurethane-acrylate materials prepared by the EB and the UV solid-state polymerization", Journal of applied polymer science, 1987, 33(5):1793-807.

(Continued)

*Primary Examiner* — Michael L Leonard
(74) *Attorney, Agent, or Firm* — Fish & Richardson P.C.

(57) ABSTRACT

A system, formulation, and method for additive manufacturing of a polishing layer of a polishing pad. The formulation includes a urethane acrylate oligomer based on a difunctional polyol or difunctional polythiol. The techniques includes selecting the difunctional polyol or the difunctional polythiol to affect a property of the polishing layer. The formulation also includes a monomer and a photoinitiator. The viscosity of the formulation is applicable for 3D printing of the polishing layer.

18 Claims, 9 Drawing Sheets

(51) Int. Cl.
  *C08G 18/10* (2006.01)
  *C08G 18/24* (2006.01)
  *C08G 18/42* (2006.01)
  *C08G 18/67* (2006.01)
  *C09D 11/102* (2014.01)
  *C09D 11/30* (2014.01)

(56) References Cited

U.S. PATENT DOCUMENTS

| | | |
|---|---|---|
| 6,293,852 B1 | 9/2001 | Roberts et al. |
| 6,841,589 B2 | 1/2005 | Schmidt et al. |
| 7,378,460 B2 | 5/2008 | Schmidt et al. |
| 7,964,696 B2 * | 6/2011 | Gunatillake ....... C08G 18/3221 528/85 |
| 8,801,949 B2 | 8/2014 | Lakrout et al. |
| 9,067,299 B2 | 6/2015 | Bajaj et al. |
| 9,394,441 B2 | 7/2016 | Xu et al. |
| 9,604,408 B2 | 3/2017 | Xu et al. |
| 10,384,330 B2 | 8/2019 | Bajaj et al. |
| 10,464,187 B2 | 11/2019 | Qian et al. |
| 10,537,974 B2 | 1/2020 | Bajaj et al. |
| 10,899,072 B2 | 1/2021 | Ellson et al. |
| 2003/0032692 A1 | 2/2003 | Mejiritski et al. |
| 2013/0283700 A1 | 10/2013 | Bajaj et al. |
| 2014/0120809 A1 | 5/2014 | Qian et al. |
| 2015/0065020 A1 | 3/2015 | Roy et al. |
| 2015/0219845 A1 | 8/2015 | Bookbinder et al. |
| 2015/0247076 A1 | 9/2015 | Kou et al. |
| 2015/0273652 A1 | 10/2015 | Qian et al. |
| 2016/0107287 A1 | 4/2016 | Bajaj et al. |
| 2016/0107288 A1 | 4/2016 | Orilall et al. |
| 2016/0107295 A1 * | 4/2016 | Bajaj ............... B24D 3/28 51/298 |
| 2016/0114458 A1 | 4/2016 | Bajaj et al. |
| 2016/0136787 A1 | 5/2016 | Bajaj et al. |
| 2017/0009001 A1 | 1/2017 | Takennouchi et al. |
| 2017/0120416 A1 | 5/2017 | Chockalingam et al. |
| 2017/0173872 A1 * | 6/2017 | McCall ............. B33Y 10/00 |
| 2017/0203408 A1 | 7/2017 | Ganapathiappan et al. |
| 2017/0252971 A1 | 9/2017 | Umebayashi |
| 2017/0291357 A1 | 10/2017 | Fong et al. |
| 2018/0100075 A1 | 4/2018 | Chopra et al. |
| 2018/0244831 A1 | 8/2018 | Hirata et al. |
| 2018/0264716 A1 | 9/2018 | Kiyosada |
| 2018/0290377 A1 | 10/2018 | Talken et al. |
| 2019/0144713 A1 | 5/2019 | Gadinski |
| 2020/0157265 A1 | 5/2020 | Ganapathiappan et al. |
| 2020/0247932 A1 * | 8/2020 | Share ................... C08G 18/755 |
| 2021/0054192 A1 * | 2/2021 | Ishiuchi ................ C08F 283/01 |
| 2021/0069860 A1 | 3/2021 | Chaudhari et al. |

FOREIGN PATENT DOCUMENTS

| | | |
|---|---|---|
| CN | 103802018 | 5/2014 |
| CN | 106029727 | 10/2016 |
| CN | 106458735 | 2/2017 |
| CN | 107073677 | 8/2017 |
| CN | 108136568 | 6/2018 |
| CN | 108290267 | 7/2018 |
| CN | 108350141 | 7/2018 |
| CN | 109867764 | 6/2019 |
| EP | 2436510 | 4/2012 |
| JP | 2015-517922 | 6/2015 |
| JP | 2018-538152 | 12/2018 |
| KR | 10-2017-0115720 | 10/2017 |
| KR | 10-2018-0054725 | 5/2018 |
| KR | 10-2018-0063363 | 6/2018 |
| TW | 201615389 | 5/2016 |
| TW | 201622972 | 7/2016 |
| WO | WO 2013/128452 | 9/2013 |
| WO | WO 2013/162856 | 10/2013 |
| WO | WO 2016/061506 | 4/2016 |
| WO | WO 2016/153711 | 9/2016 |
| WO | WO 2017/047615 | 3/2017 |
| WO | WO 2017/066077 | 4/2017 |
| WO | WO 2017/074773 | 5/2017 |
| WO | WO 2018/160614 | 9/2018 |
| WO | WO 2020/073149 | 4/2020 |

OTHER PUBLICATIONS

PCT International Search Report and Written Opinion in International Appln. No. PCT/US2020/050243, dated Dec. 24, 2020, 12 pages.

Extended European Search Report in European Appln. No. 20862488.2, dated Aug. 30, 2023, 8 pages.

Office Action in U.S. Appl. No. 16/681,714, dated Sep. 14, 2023, 14 pages.

Yang, "Weathering Resistant Oligomers," Presented at RadTech Asia 95: Radiation Curing Conference, Proceedings, Guilin, China, Nov. 20-24, 1995, retrieved on Sep. 3, 2023, <URL: https://inisiaea.org/collection/NCLCollectionStoreLPublic/28/042/28042403.pdf>, pp. 43-51.

He et al., "Paint Resin Chemistry," Chemistry Industry Press, Jul. 2007, 1:339-340 (with English summary).

Office Action in Chinese Appln. No. 202080074378.X, dated Oct. 28, 2023, 11 pages (with partial English translation).

* cited by examiner

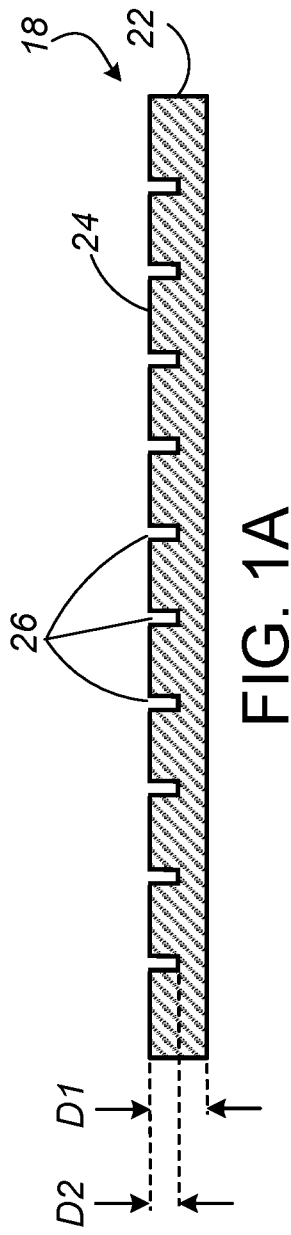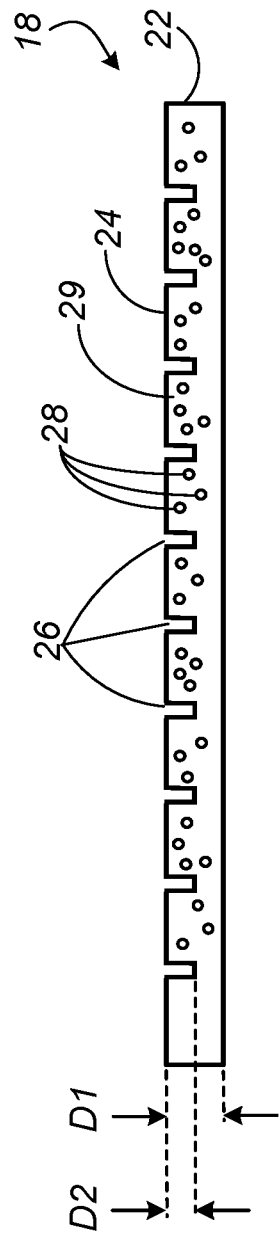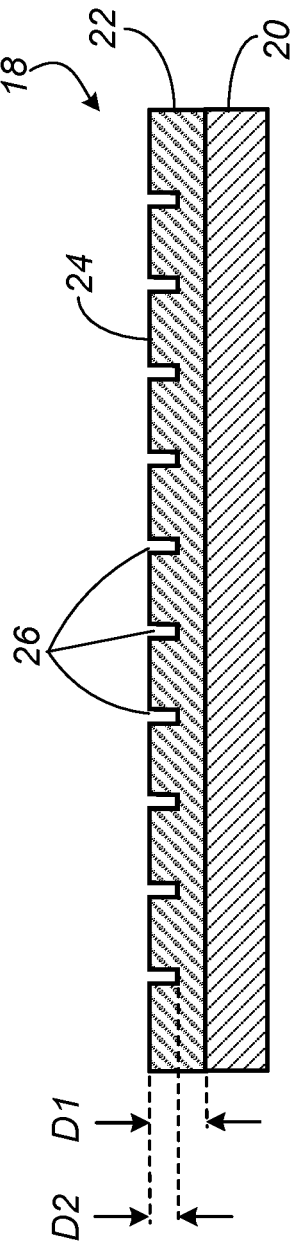

General Structure A:
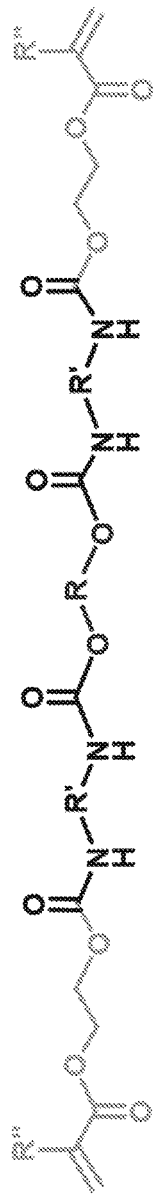
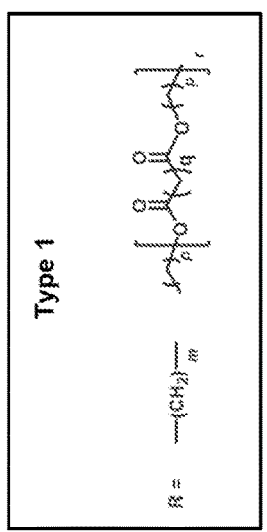
Type 1
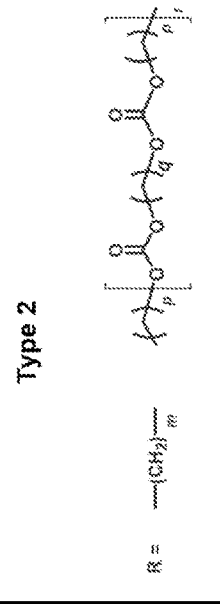
Type 2
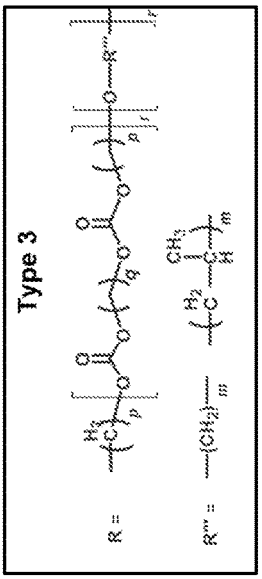
Type 3
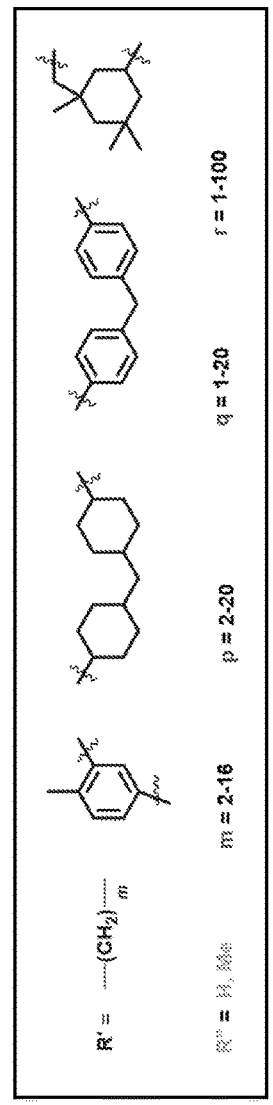
FIG. 5

General structure B:
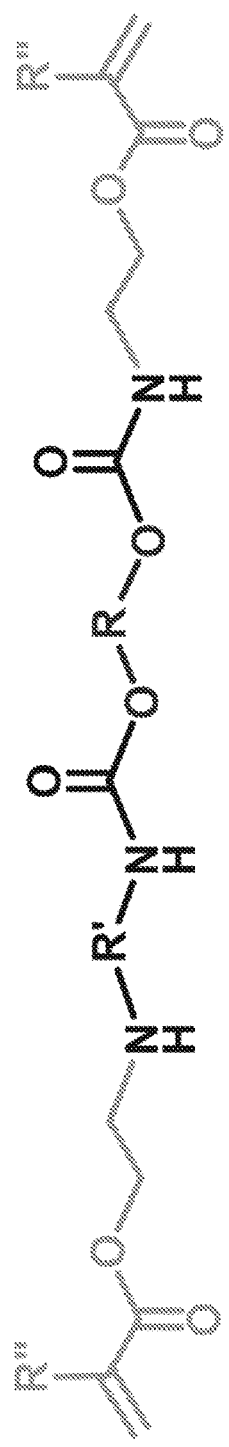
Type 4
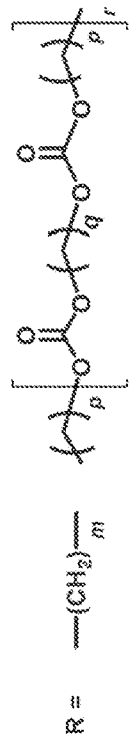
Type 5
FIG. 6

General structure C:
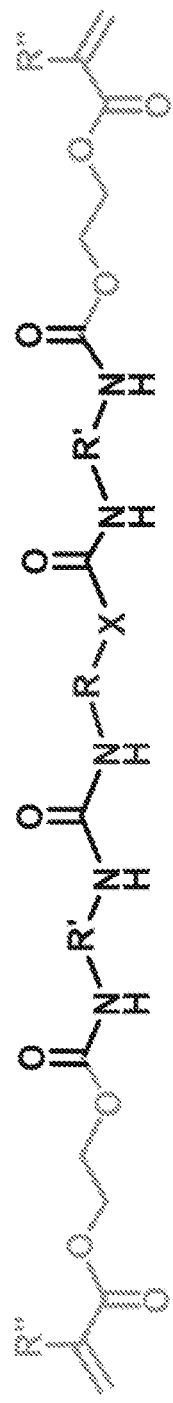
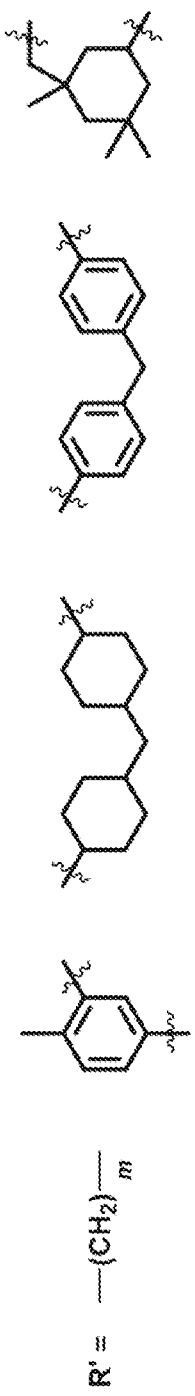
FIG. 7

ADDITIVE MANUFACTURING OF POLISHING PADS

TECHNICAL FIELD

This disclosure relates to polishing pads utilized in chemical mechanical polishing.

BACKGROUND

An integrated circuit is typically formed on a substrate by the sequential deposition of conductive, semiconductive, or insulative layers on a silicon wafer. A variety of fabrication techniques employ planarization of a layer on the substrate. For example, for certain applications, e.g., polishing of a metal layer to form vias, plugs, and lines in the trenches of a patterned layer, an overlying layer is planarized until the top surface of a patterned layer is exposed. In other applications, e.g., planarization of a dielectric layer for photolithography, an overlying layer is polished until a desired thickness remains over the underlying layer.

Chemical mechanical polishing (CMP) is one accepted technique of planarization. In application, this planarization technique may mount the substrate on a carrier head. The exposed surface of the substrate is typically placed against a rotating polishing pad. The carrier head provides a controllable load on the substrate to push the substrate against the polishing pad. A polishing liquid, such as slurry with abrasive particles, may be supplied to the surface of the polishing pad. One objective of a chemical mechanical polishing may be polishing uniformity. If different areas on the substrate are polished at different rates, then it is possible for some areas of the substrate to have too much material removed ("overpolishing") or too little material removed ("underpolishing"). In addition to planarization, polishing pads can be used for finishing operations such as buffing.

Polishing pads for CMP may include "standard" pads and fixed-abrasive pads. A standard pad may have as a polyurethane polishing layer with a durable roughened surface, and can also include a compressible backing layer. In contrast, a fixed-abrasive pad has abrasive particles held in a containment media, and can be supported on a generally incompressible backing layer.

Polishing pads are typically made by molding, casting, or sintering polyurethane materials. In the case of molding, the polishing pads can be made one at a time, e.g., by injection molding. In the case of casting, the liquid precursor is cast and cured into a cake, which is subsequently sliced into individual pad pieces. These pad pieces can then be machined to a final thickness. Grooves can be machined into the polishing surface, or be formed as part of the injection molding process.

SUMMARY

An aspect relates to a formulation for three dimensional (3D) printing of a polishing layer of a polishing pad. The formulation includes a urethane acrylate oligomer based on (e.g., incorporating) a difunctional polyol or difunctional polythiol. The formulation also includes monomer (e.g., multiple monomers), an additive, and a photoinitiator. The viscosity of the formulation is applicable for 3D printing of the polishing layer.

Another aspect relates to a method of synthesizing a urethane acrylate oligomer for additive manufacturing of a polishing pad. The method includes selecting a difunctional polyol or difunctional polythiol to affect a property of a polishing layer of the polishing pad. The method includes performing a catalytic reaction of the difunctional polyol or the difunctional polythiol with a difunctional isocyanate to give a urethane oligomer. The method includes capping the urethane oligomer with an acrylate to give the urethane acrylate oligomer, wherein the urethane acrylate oligomer as applied in the additive manufacturing affects the property.

Yet another aspect relates to a method of synthesizing a urethane acrylate oligomer for additive manufacturing of a polishing pad. The method includes choosing a difunctional polyol or difunctional polythiol to affect a viscosity of a 3D printing formulation having the urethane acrylate oligomer in the additive manufacturing and to affect a property of a polishing layer of the polishing pad. The method includes reacting in presence of catalyst the difunctional polyol or the difunctional polythiol with a difunctional isocyanate to give a urethane oligomer prepolymer. The method includes incorporating an acrylate as end caps on the urethane oligomer prepolymer to give the urethane acrylate oligomer, wherein the urethane acrylate oligomer in the additive manufacturing affects the property.

Yet another aspect relates to a method of fabricating a polishing pad. The method includes injecting a formulation having a urethane acrylate oligomer through a nozzle to form a polishing layer of the polishing pad. The urethane acrylate oligomer is a urethane oligomer end-capped with an acrylate. The urethane oligomer is based on a difunctional polyol and a difunctional isocyanate or based on a difunctional polythiol and the difunctional isocyanate. The method includes applying light to the formulation to cure the urethane acrylate oligomer as injected, wherein the difunctional polyol or the difunctional polythiol are selected to affect a property of the polishing layer.

The details of one or more implementations are set forth in the accompanying drawings and the description below. Other features and advantages will be apparent from the description and drawings, and from the claims.

BRIEF DESCRIPTION OF DRAWINGS

FIG. 1A is a schematic cross-sectional side view of an example polishing pad.

FIG. 1B is a schematic cross-sectional side view of another example polishing pad.

FIG. 1C is a schematic cross-sectional side view of yet another example polishing pad.

FIGS. 5-7 are diagrams of exemplary polyurethane acrylate oligomers that may be synthesized.

Like reference symbols in the various drawings indicate like elements.

DETAILED DESCRIPTION

Figure 2:
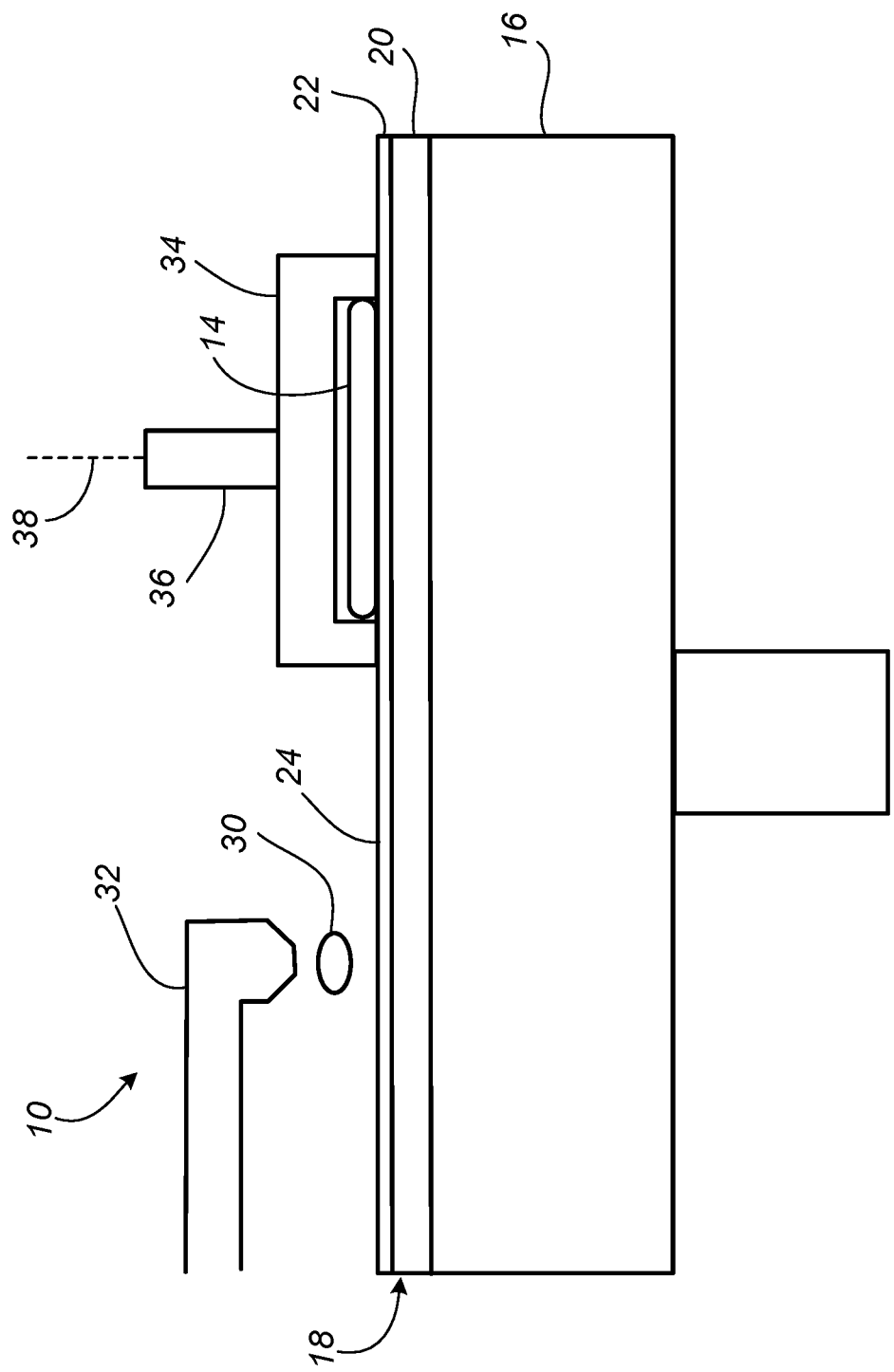
FIG. 2 is a schematic side view, partially cross-sectional, of a chemical mechanical polishing station.

Some aspects of the present disclosure are directed to a formulation for 3D printing of a polishing layer of a polishing pad. The formulation includes a urethane acrylate oligomer synthesized with a difunctional polyol or difunctional polythiol. A polyol is an organic compound containing multiple hydroxyl groups. Polythiols are compounds with several mercaptans functions. The formulation may further include monomer (e.g., a mixture of monomers), an additive, a photoinitiator, and so on. The viscosity of the formulation is applicable for 3D printing of the polishing layer.

The urethane acrylate oligomer may be a semi-crystalline polyester-based urethane acrylate that is an ultraviolet (UV) curable oligomer synthesized by catalytic reaction of a difunctional polyol (or difunctional polythiol) and a difunctional isocyanate. The difunctional polyol may be, for example, a semi-crystalline polyester polyol. In particular for the synthesis, the catalytic reaction of a difunctional polyol (or difunctional polythiol) and a difunctional isocyanate may give a urethane oligomer as a prepolymer. The prepolymer is then capped by using acrylates to yield a urethane acrylate oligomer as the UV curable oligomer. The urethane formed from isocyanate groups may give toughness to the oligomer while the urethane formed from polyols may give flexibility. Implementations of the present techniques may include selecting the difunctional polyol or difunctional polythiol to affect a property of a polishing layer of the polishing pad. The difunctional polyol may be, for example, a polyester polyol, polycarbonate polyol, poly(ester-ether) polyol, poly(carbonate-ester) polyol, or mixtures thereof. The polythiols may be corresponding structure with —SH group in place of the —OH group.

The chemical structure of polyols (e.g., semi-crystalline polyesters) or polythiols in the synthesis of the prepolymer for the end-capped oligomer play a role in giving desired properties of the oligomer and thus specific values of properties of the polishing layers. Two polyols with similar backbone chemistry but with different functional groups may lead to different properties of the oligomer and the polishing layers. Similarly, two polythiols with similar backbone chemistry but with different functional groups may lead to different properties of the oligomer and the polishing layers.

These oligomers formed with semi-crystalline polyester polyol (or corresponding polythiol) may possess high crystallinity and hence give good toughness to the material after photopolymerization. In implementations, these urethane acrylate oligomers can be synthesized with desired final properties. In certain implementations, the oligomer synthesis may be solvent-free at relatively low temperature and performed under inert atmosphere.

The technique may include preparing a formulation of the urethane acrylate oligomers with other monomers, additives, and photoinitiators. With the urethane acrylate oligomers of the present techniques, the formulation may have a relatively low viscosity to facilitate 3D printing of the formulation for manufacturing CMP pads. The formulations may be prepared as a homogeneous mixture of urethane acrylate oligomer, monomers (e.g., acrylic monomers), additives, and photoinitiators. The formulation may then be 3D printed to make the CMP Pads. These CMP Pads may have a high modulus and good elasticity for semiconductor applications.

Referring to FIG. 1A-1C, a polishing pad 18 includes a polishing layer 22. As shown in FIG. 1A the polishing pad can be a single-layer pad that consists of the polishing layer 22, or as shown in FIG. 1C the polishing pad can be a multi-layer pad that includes the polishing layer 22 and at least one backing layer 20.

The polishing layer 22 can be a material that is inert in the polishing. The material of the polishing layer 22 can be a plastic, e.g., a polyurethane. In some implementations the polishing layer 22 is a relative durable and hard material. For example, the polishing layer 22 can have a hardness of about 40 to 80, e.g., 50 to 65, on the Shore D scale. The polishing layer 22 may be formed from a urethane acrylate oligomer.

As shown in FIG. 1A, the polishing layer 22 can be a layer of homogeneous composition, or as shown in FIG. 1B the polishing layer 22 can include abrasive particles 28 held in a matrix 29 of plastic material, e.g., polyurethane. The abrasive particles 28 are harder than the material of the matrix 29. The abrasive particles 28 can be from 0.05 weight percent (wt %) to 75 wt % of the polishing layer. For example, the abrasive particles 28 can be less than 1 wt % of the polishing layer 22, e.g., less than 0.1 wt %. Alternatively, the abrasive particles 28 can be greater than 10 wt % of the polishing layer 22, e.g., greater than 50 wt %. The material of the abrasive particles can be a metal oxide, such as ceria, alumina, or silica, or any combinations thereof. Moreover, in some implementations, the polishing layer includes pores, e.g., small voids. The pores can be 50-100 microns wide.

The polishing layer 22 can have a thickness D1 of 80 mils or less, 50 mils or less, or 25 mils or less. Because the conditioning process tends to wear away the cover layer, the thickness of the polishing layer 22 can be selected to provide the polishing pad 18 with a useful lifetime, e.g., 3000 polishing and conditioning cycles.

On a microscopic scale, the polishing surface 24 of the polishing layer 22 can have rough surface texture, e.g., a root mean squared (rms) surface-roughness of 2-4 microns. For instance, the polishing layer 22 can be subject to a grinding or conditioning process to generate the rough surface texture. In addition, 3D printing can provide small uniform features, e.g., down to 200 microns.

Although the polishing surface 24 can be rough on a microscopic scale, the polishing layer 22 can have good thickness uniformity on the macroscopic scale of the polishing pad itself. This uniformity may refer to the global variation in height of the polishing surface 24 relative to the bottom surface of the polishing layer, and does not count any macroscopic grooves or perforations deliberately formed in the polishing layer. The thickness non-uniformity can be less than 1 mil.

In some embodiments, at least a portion of the polishing surface 24 can include a plurality of grooves 26 formed therein for carrying slurry. The grooves 26 may be of nearly any pattern, such as concentric circles, straight lines, a cross-hatched, spirals, and the like. In embodiments with grooves present, then on the polishing surface 24, the plateaus between the grooves 26 can be, for example, 25-90% of the total horizontal surface area of the polishing pad 18. Thus, the grooves 26 can occupy 10%-75% of the total horizontal surface area of the polishing pad 18. The plateaus between the grooves 26 can have a lateral width of about 0.1 to 2.5 mm.

In some implementations, e.g., if there is a backing layer 20, the grooves 26 can extend entirely through the polishing layer 22. In some implementations, the grooves 26 can extend through about 20-80%, e.g., at 40-60%, of the thickness of the polishing layer 22. The depth of the grooves 26 can be 0.25 to 1 mm. For example, in a polishing pad 18 having a polishing layer 22 that is 40-60 mils thick, e.g., 50 mils thick, the grooves 26 can have a depth D2 of about 15-25 mils, e.g., 20 mils.

The backing layer 20 can be softer and more compressible than the polishing layer 22. The backing layer 20 can have a hardness of 80 or less on the Shore A scale, e.g., a hardness of about 60 Shore A or less. The backing layer 20 can be thicker or thinner than (or the same thickness as) the polishing layer 22.

In certain implementations, the backing layer 20 can be an open-cell or a closed-cell foam, such as polyurethane or polysilicone with voids, so that under pressure the cells collapse and the backing layer compresses. Examples of material for the backing layer are PORON 4701-30 from Rogers Corporation, in Rogers, Conn., or SUBA-IV from Rohm & Haas. The hardness of the backing layer 20 can generally be adjusted by selection of the layer material and porosity. Alternatively, the backing layer 20 can be formed from the same precursor and have the same porosity as the polishing layer, but have a different degree of curing so as to have a different hardness.

Turning now to FIG. 2, one or more substrates 14 can be polished at a polishing station 10 of a CMP apparatus. A description of an applicable polishing apparatus can be found in U.S. Pat. No. 5,738,574, the entire disclosure of which is incorporated herein by reference.

The polishing station 10 can include a rotatable platen 16 on which is placed the polishing pad 18. During polishing, a polishing liquid 30, e.g., abrasive slurry, can be supplied to the surface of polishing pad 18 by a slurry supply port or combined slurry/rinse arm 32. The polishing liquid 30 can contain abrasive particles, a pH adjuster, or chemically active components.

The substrate 14 is held against the polishing pad 18 by a carrier head 34. The carrier head 34 is suspended from a support structure, such as a carousel, and is connected by a carrier drive shaft 36 to a carrier head rotation motor so that the carrier head can rotate about an axis 38. The relative motion of the polishing pad 18 and the substrate 14 in the presence of the polishing liquid 30 results in polishing of the substrate 14.

Figure 3:
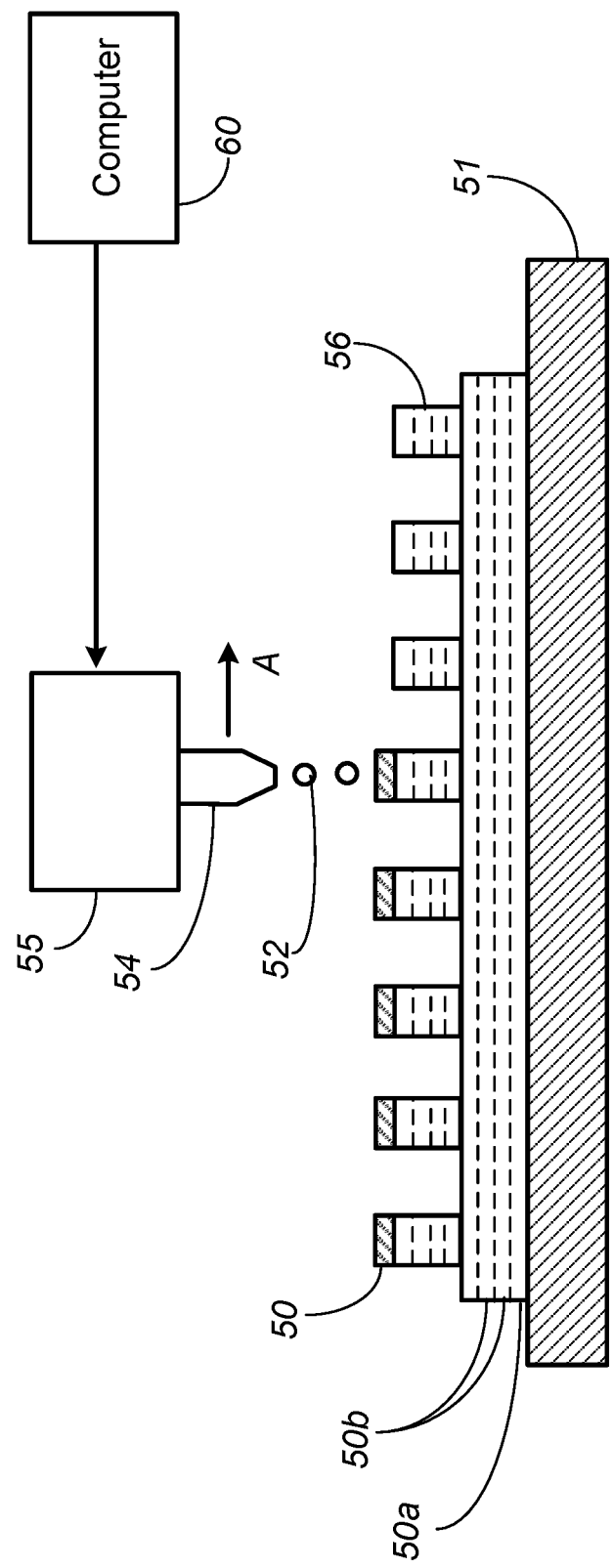
FIG. 3 is a schematic side view illustrating a substrate in contact with the polishing pad of FIG. 1A.

Referring to FIG. 3, at least the polishing layer 22 of the polishing pad 18 is manufactured utilizing 3D printing. In the manufacturing, thin layers of material are progressively deposited and fused. For example, droplets 52 of a formulation of pad precursor material can be ejected from a nozzle 54 of a droplet ejecting printer 55 to form a layer 50. The droplet ejecting printer is similar to an inkjet printer, but employs the pad precursor material rather than ink. The nozzle 54 translates (shown by arrow A) across a support 51.

For a first layer 50a deposited, the nozzle 54 can eject onto the support 51. For subsequently deposited layers 50b, the nozzle 54 can eject onto the already solidified material 56. After each layer 50 is solidified, a new layer is then deposited over the previously deposited layer until the full 3-dimensional polishing layer 22 is fabricated. Each layer is applied by the nozzle 54 in a pattern stored in a 3D drawing computer program that runs on a computer 60. Each layer 50 is less than 50% of the total thickness of the polishing layer 22, e.g., less than 10%, e.g., less than 5%, e.g., less than 1%.

The support 51 can be a rigid base, or be a flexible film, e.g., a layer of polytetrafluoroethylene (PTFE). If the support 51 is a film, the support 51 can form a portion of the polishing pad 18. For example, the support 51 can be the backing layer 20 or a layer between the backing layer 20 and the polishing layer 22. Alternatively, the polishing layer 22 can be removed from the support 51.

Solidification can be accomplished by polymerization. For example, the layer 50 of pad precursor material can be a formulation that includes a monomer, and the monomer can be polymerized in-situ by ultraviolet (UV) curing. The pad precursor material can be cured effectively immediately upon deposition, or an entire layer 50 of pad precursor material can be deposited and then the entire layer 50 be cured simultaneously.

However, there are alternative technologies to accomplish 3D printing. For example, the droplets 52 can be a polymer melt that solidifies upon cooling. Alternatively, the printer creates the polishing layer 22 by spreading a layer of powder and ejecting droplets of a binder material onto the layer of powder. In that case, the powder could include additives, e.g., the abrasive particles 28.

The 3D printing generally avoids the need for making molds, which can be relatively expensive and their use add time in the manufacturing. The 3D printing may eliminate several conventional-pad manufacturing steps, such as molding, casting, and machining. Additionally, tight tolerances can generally be achieved in 3D printing due to the layer-by-layer printing. Also, one printing system (with printer 55 and computer 60) can be employed to manufacture a variety of different polishing pads, simply by changing the pattern stored in the 3D drawing computer program in certain embodiments.

In some implementations, the backing layer 20 can also be fabricated by 3D printing. For example, the backing layer 20 and polishing layer 22 could be fabricated in an uninterrupted operation by the printer 55. The backing layer 20 can be provided with a different hardness than the polishing layer 22 by applying a different amount of curing, e.g., a different intensity of UV radiation.

In other implementations, the backing layer 20 is fabricated by a conventional process and then secured to the polishing layer 22. For instance, the polishing layer 22 can be secured to the backing layer 20 by a thin adhesive layer, e.g., as a pressure-sensitive adhesive.

Figure 4:
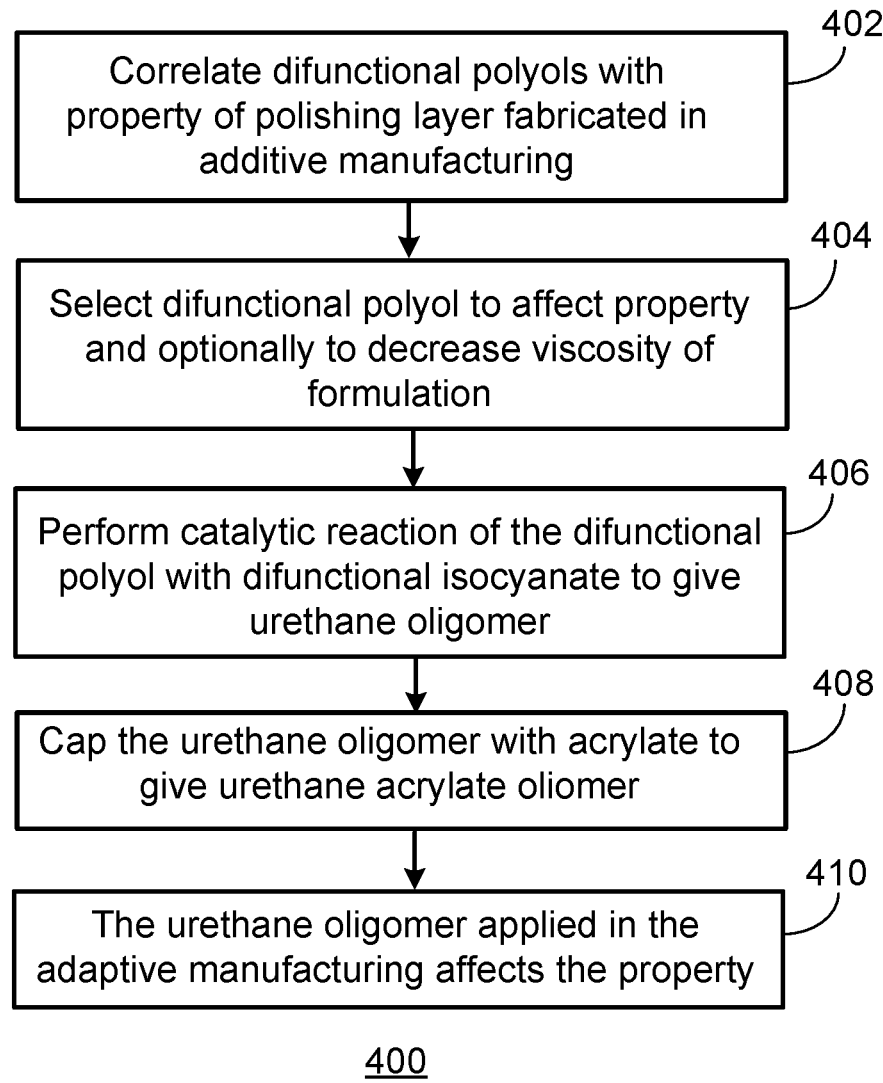
FIG. 4 is a block flow diagram of a method of urethane acrylate oligomers for inclusion in a formulation for 3D printing of a polishing pad.

FIG. 4 is a method 400 of synthesizing urethane acrylate oligomers for inclusion in a formulation for 3D printing of a polishing layer of a polishing pad. The polishing pad may be a CMP pad. The urethane acrylate oligomer may be viscous in nature. The 3D printing formulation having the urethane acrylate oligomer and monomer (e.g., acrylic monomers) may be a free-flowing viscous liquid at a viscosity in a range of 10 cP to 20 cP at a temperature of 70° C.

At block 402, the method includes correlating multiple difunctional polyols (e.g., different polyester polyols) of differing structures with different values of a physical property of the polishing layers of polishing pads fabricated via additive manufacturing. Likewise, corresponding difunctional polythiols of the differing structures may be included in the correlation with values of the physical property.

The different difunctional polyols/polythiols may be correlated with a property of the polishing layers fabricated in additive manufacturing (e.g., 3D printing) from a formulation having a urethane acrylate oligomer formed from the difunctional polyols or difunctional polythiols. The physical property may be, for example, elongation at break, storage modulus at higher temperature (e.g., 40° C. to 90° C.), glass transition temperature, melting point, or ultimate tensile strength (UTS). These oligomers formed may maintain storage modulus at higher temperature while maintaining elongation at break and UTS.

The exact chemical composition and structure of the urethane acrylate oligomer synthesized from the difunctional polyol (or polythiol) affects the physical property of the polishing pad as fabricated in the additive manufacturing. The formulation having the urethane acrylate oligomer as ejected through the 3D printer nozzles may be subjected to photopolymerization to form a polishing layer. The urethane acrylate oligomer as applied may be the urethane acrylate oligomer subjected to UV light to cure or crosslink the urethane acrylate oligomer along with other acrylic monomers, photoinitiators, and additives. The additives may adjust viscosity and curability of the formulation and mechanical properties of the polishing layer.

At block 404, the method includes selecting a difunctional polyol or difunctional polythiol to affect the property (e.g., elongation, UTS, etc.) of the polishing layer. The effect on the physical property may be an increase in a value of the property, e.g., increased elongation at break or UTS. The difunctional polyol may be selected to meet a specified numerical range of the property of the polishing layer.

The method may include selecting a difunctional polyol (or difunctional polythiol) to decrease viscosity of the 3D printer formulation having the urethane acrylate oligomer synthesized with the difunctional polyol, or to meet a specified numerical range of the viscosity of a formulation or such that the viscosity is below a maximum value. In some implementations, this maximum value of the viscosity of the formulation as ejected through a 3D printer nozzle in the additive manufacturing is 20 centipoise (cP).

At block 406, the method includes performing a catalytic reaction of the selected difunctional polyol or difunctional polythiol with a difunctional isocyanate to give a urethane oligomer (e.g., as a prepolymer). The difunctional isocyanate may be, for example, a diisocyanate. In one implementation, a catalyst in the catalytic reaction is dibutyltindilaurate (DBTDL).

At block 408, the method includes capping the urethane oligomer with acrylate to give a urethane acrylate oligomer 410. The acrylate may be, for example, 2-hydroxyethyl acrylate.

An implementation is a formulation for 3D printing of a polishing layer of a polishing pad. The polishing layer fabricated by the 3D printing utilizing the formulation may have an elongation at break of at least 8% and UTS of at least 30 megapascals (MPa).

The formulation includes a urethane acrylate oligomer, monomer, an additive, and a photoinitiator. The additive may be, for example, silicones, polyether silicones, or surfactants. In implementations, the formulation need not include a solvent as solvent can act as plasticizer to reduce or adversely affect mechanical properties.

The monomer may generally be a mixture of monomers. The monomer may be an acrylic monomer(s). The acrylic monomers may be include methacrylic monomer. The monomer may be a monomer with a moiety having a polymerizable olefinic group.

The monomer may be, for example, isobornyl acrylate, cyclohexyl acrylate, trimethylcyclohexyl acrylate, dipropylene glycol diacrylate, tripropylene glycol diacrylate, tetrahydrofurfuryl acrylate, N,N-dimethylacrylamide, N,N-diethylacrylamide, butanediol diacrylate, hexanediol diacrylate, pentaerythritol tri- and tetraacrylate, vinylpyrrolidone, and the like. Other monomers are applicable.

The photoinitiator may be, for example, Omnirad™ 819, Omnirad™ 184, or Omnirad™ 4265 all available from IGM Resins USA Inc. having headquarters in Charlotte, N.C., USA. Another example of a photoinitiator is Genocure™* PBZ (a 4-pehylbenzophenone) available from RAHN USA Corp. having headquarters in Aurora, Ill., USA. Yet another example of a photoinitiator is Irgacure® TPO or TPO-L (or the mixture) available from BASF Schweiz AG having headquarters in Basel, Switzerland. The photoinitiator can have tertiary amino compounds (for example triethanolamine or the like) that can have proton abstraction possible in conjunction with Type II photoinitiator to generate radical.

As discussed, the urethane acrylate oligomer may be synthesized with a difunctional polyol. Two implementations of the difunctional polyol have the following respective structure:

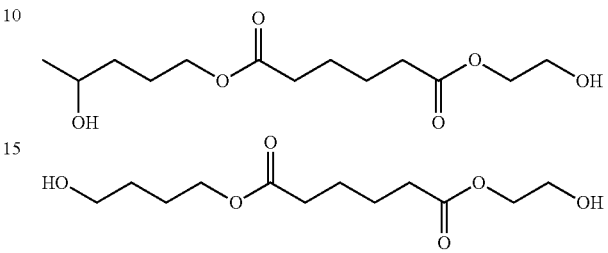

FIGS. 5-7 are examples of polyurethane acrylate oligomers that may be synthesized in the present techniques and that may give desired properties of the 3-D printing formulation and the polishing layers of the polishing pad. FIG. 5 is a General Structure A that may be at least three types: Type 1, Type 2, and Type 3. FIG. 6 is a General Structure B that may be at least two types: Type 4 and Type 5. FIG. 7 is a General Structure C that may be at least Type 6. The options for R' of General Structure B are the same as for R' of General Structures A and C. In FIGS. 5-7, for two R in a Type structure, each R in that given structure are different. Type 1 is meant for alkanediol and polyester diol. Type 2 is meant for alkanediol and polycarbonate diol.

Figure 8:
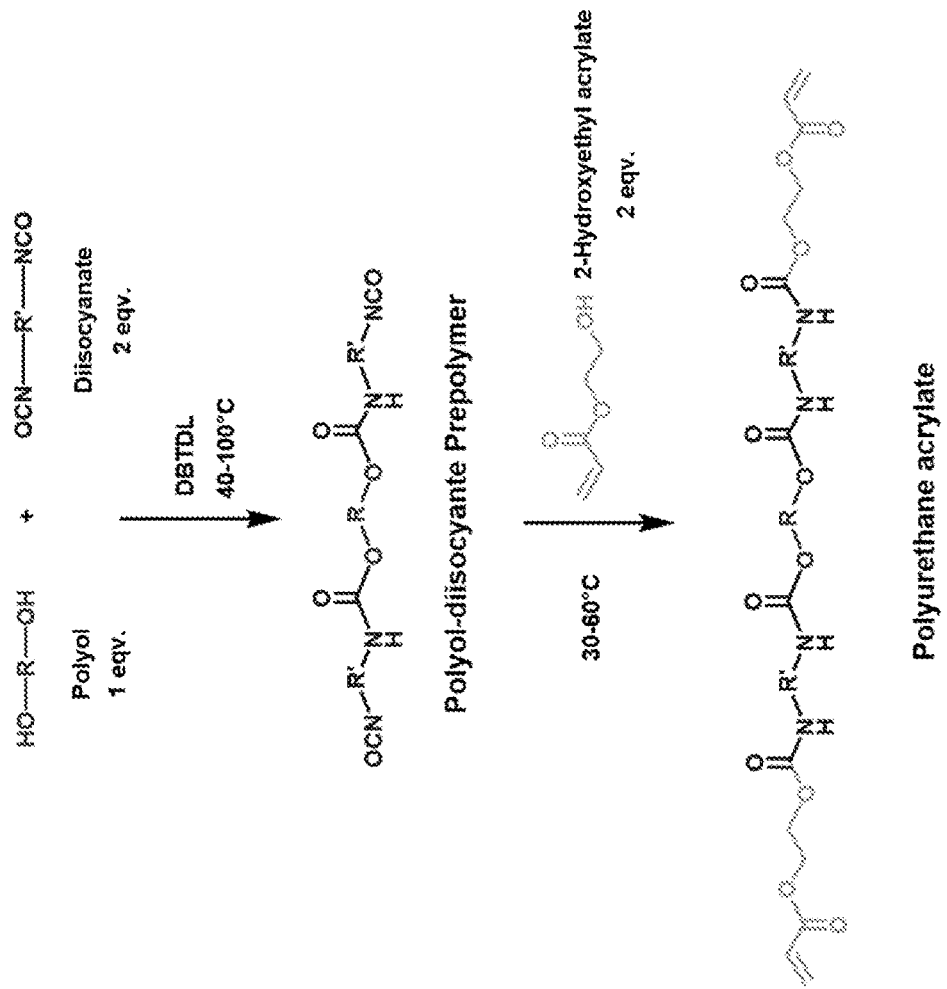
FIG. 8 is a diagram of an exemplary synthesis of polyurethane acrylate oligomers.

FIG. 8 is an exemplary synthesis of polyurethane acrylate oligomers in accordance with certain implementations. The synthesis starts with a polyol (1 mole equivalent) and a diisocyanate (2 mole equivalent). The catalyst DBTDL is included and the mixture heated to a temperature in a range of 40° C. to 100° C. to give the polyol-diisocyanate prepolymer. Lastly, in this illustrated implementation, 2-hydroxethyl acrylate (2 mole equivalent) is mixed with the prepolymer at a temperature in the range of 40° C. to 100° C. to end-cap the prepolymer at both ends with the acrylate to give the polyurethane acrylate oligomer.

Figure 9:
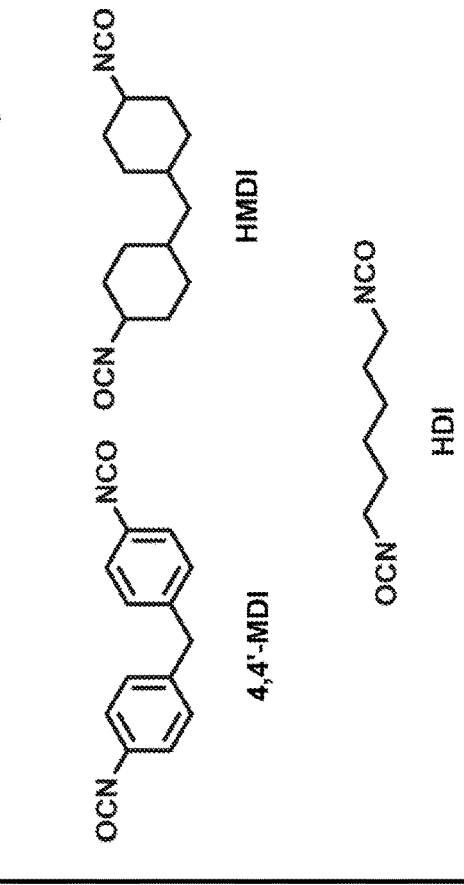
FIG. 9 is a diagram of exemplary difunctional polyols/polythiols and difunctional isocyanates that may be utilized to form polyurethane acrylate oligomers.

FIG. 9 are examples of difunctional polyols/polythiols and difunctional isocyanates that may be utilized to form polyurethane acrylate oligomers. In these illustrated examples, the exemplary polyols include polyether polyol, polyester polyol, and polycarbonate polyol. The corresponding polythiols (not depicted) are as the depicted polyols but with the —OH group instead as an —SH group. The exemplary difunctional isocyanates (OCN—R'—NCO) are the structures labeled as TDI, IPDI, 4,4'-MDI, HMDI, and HDI, respectively.

The viscosity of the formulation is applicable for 3D printing of the polishing layer. For example, the viscosity of the formulation is less than 20 cP at 70° C. The formulation may have a viscosity for ejection of the formulation through a 3D printing ejection nozzle. The viscosity may be in a range of 10 cP to 20 cP at a temperature of 70° C.

In some implementations, concentration of the urethane acrylate oligomer in the formulation may be in a range of 10 wt % to 35 wt %, e.g., 20-25 wt %. Concentration of the monomer in the formulation may be, for example, in a range of 60 wt % to 85 wt %, e.g., 70-75 wt %. Concentration of the photoinitiator in the formulation may be, for example, in a ranges of 1 wt % to 5 wt % or 1 wt % to 7.5 wt %.

A method of fabricating a polishing pad, such as a CMP pad, includes injecting (e.g., in 3D printing) a formulation having a urethane acrylate oligomer through a nozzle to form a polishing layer of the polishing pad. The urethane acrylate oligomer is a urethane oligomer end-capped with an acrylate. The urethane oligomer is a product of a catalytic reaction of a difunctional polyol (or difunctional polythiol) and a difunctional isocyanate.

Light is applied to the formulation to cure the ejected urethane acrylate oligomer to form the polishing layer. The difunctional polyol (or difunctional polythiol) is selected to affect a physical property of the polishing layer. The physical property may be, for example, elongation at break, UTS, or storage modulus, and the polyol may be selected such that the property satisfies a minimum value or meets a specified numerical range. The difunctional polyol (or difunctional polythiol) may also be selected to decrease viscosity of the formulation having the urethane acrylate oligomer synthesized from the difunctional polyol (or difunctional polythiol).

As discussed, the formulation may include monomer, an additive, and a photointiator. Component concentrations in the formulation may include the urethane acrylate oligomer less than 35 wt %, the monomer greater than 60 wt %, and photoinitiator less than 5 wt %. In implementations, the formulation has a viscosity in a range of 10 cP to 20 cP at a temperature of 70° C. for ejection of the formulation through the nozzle.

EXAMPLES

The Examples are given only as examples and not meant to limit the present techniques. The Examples include Example 1 and Example 2. The difunctional polyol in Example 1 is different than the difunctional polyol in Example 2. The Examples demonstrate that the polyol affects the final properties of the oligomer and associated cured formulation having the oligomer (e.g., the cured formulation as a polishing layer of a polishing pad). The Examples compare the two different polyols (with similar chemical nature or structure) that gave different properties of the oligomer and the cured material having the oligomer.

Thus, in implementations of the present techniques, oligomers can be synthesized with desired final properties based on selection of the difunctional polyol. In certain implementations, the oligomer synthesis may be solvent-free at relatively low temperature and performed under inert atmosphere. The oligomer synthesis could involve synthesis with one of the monomers (comonomers) utilized for ease-of-handling and the reaction carried out in a controlled way.

As indicated, the urethane acrylate oligomers in Example 1 and Example 2 were synthesized using two different semi-crystalline polyester polyols, respectively. The oligomers were synthesized by weighing 1 mole equivalent of the polyol in a three neck round bottom flask with a continuous purge of nitrogen gas. The two side necks were utilized for the nitrogen (N2) inlet and outlet, respectively, while the middle neck was utilized for mechanical stirring. In addition to the polyol, 2 moles equivalent of diisocyanates were added to the three neck round bottom flask. The reaction mixture in the flask was stirred and a catalyst (dibutyltindilaurate, DBTDL) was added. The prepolymer was obtained after stirring the reaction mixture at 55° C. for 6 hours. The reaction mixture was then cooled to 45° C. and 2 moles equivalent of 2-hydroxyethly acrylate were was added to the reaction mixture as the capping agent to form the final oligomer. The final oligomer (a urethane acrylate oligomer) was a free-flowing viscous liquid.

Formulations were then prepared by making a homogeneous mixture of the urethane acrylate oligomer, monomers, and photoinitiators. In particular, the formulations included urethane acrylate oligomer (15-25 wt %), monomers (70-80 wt %), additives (2-5 wt %) and photoinitiator (2 wt %). The formulations were cured bulk in a silicone mold of Type V dogbones (with thickness of 2 mm) by exposing to UV light up to 1140 mJ/cm2 in a Heraeus UV curing station with 3 passes at 18 ft/min (each pass exposed at 380 mJ/cm2). In practice, these formulations may be 3D printed and then cured to make CMP Pads, including CMP Pads having a high modulus and good elasticity for semiconductor applications. Accordingly the UV dosage can be reduced depending up on the thickness of samples.

Example 1

In Example 1, the difunctional polyol was STEPANPOL® PC-1040-55 available from Stepan Company having headquarters in Northfield, Ill., USA. STEPANPOL® PC-1040-55 is a linear aliphatic polyester polyol and, in particular, a 2,000 molecular-weight polyethylene/polybutylene adipate diol. As discussed, the polyol was utilized to synthesize a urethane acrylate oligomer.

For the formulation having about 18 wt % of the oligomer, about 78 wt % monomer, and about 2 wt % photoinitiator, the viscosity was in the range of 15 cP to 17 cP at 70° C. The cured formulation had the properties listed below in Table 1.

TABLE 1

| Properties of Cured Formulation in Example 1 | |
|---|---|
| Elongation (%) | 18-21 |
| UTS (MPa) | 39-42 |
| Storage Modulus at 30° C. (MPa) | 1200-1400 |
| Storage Modulus at 90° C. (MPa) | 100-300 |

Example 2

In Example 2, the difunctional polyol was STEPANPOL® PC-101P-55 also available from Stepan Company and is a solvent-free saturated polyester resin. STEPANPOL® PC-101P-55 is a linear aliphatic polyester polyol and is a general-purpose polyester yielding urethane elastomers. As discussed, the polyol was utilized to synthesize a urethane acrylate oligomer.

For the formulation having about 18 wt % of the oligomer, about 78 wt % monomer, and about 2 wt % photoinitiator, the viscosity was in the range of 12 cP to 14 cP at 70° C. The cured formulation had the properties listed below in Table 2.

TABLE 2

| Properties of Cured Formulation in Example 2 | |
|---|---|
| Elongation (%) | 10-12 |
| UTS (MPa) | 35-45 |
| Storage Modulus at 30° C. (MPa) | 1200-1400 |
| Storage Modulus at 90° C. (MPa) | 200-300 |

An implementation is a formulation for 3D printing of a polishing layer of a polishing pad. The polishing layer may have an elongation of at least 8% and UTS of at least 30 MPa. The formulation includes a urethane acrylate oligomer based on a difunctional polyol or difunctional polythiol. The urethane acrylate oligomer may be semi-crystalline with a crystallinity in a range of 1% to 50%. The formulation also includes monomer (e.g., multiple monomers), an additive, and a photoinitiator. The additive may include, for example, a silicone, a polyether silicone, or a surfactant, or any combinations thereof. The concentration of the urethane acrylate oligomer in the formulation may be, for example, in a range of 10 wt % to 35 wt %. The concentration of the monomer in the formulation may be, for example, in a range of 60 wt % to 85 wt %. The concentration of the photoinitiator in the formulation may be, for example, in a range of 1 wt % to 5 wt %. The multiple monomers may include an acrylic monomer or multiple acrylic monomers. An acrylic monomer may be a methacrylic monomer. The monomer may be monomer with a moiety having a polymerizable olefinic group. In some instances, the monomer may include isobornyl acrylate, cyclohexyl acrylate, trimethylcyclohexyl acrylate, dipropylene glycol diacrylate, tripropylene glycol diacrylate, tetrahydrofurfuryl acrylate, N,N-dimethylacrylamide, N,N-diethylacrylamide, butanediol diacrylate, hexanediol diacrylate, pentaerythritol tri- and tetraacrylate, vinylpyrrolidone, or any combinations thereof. The viscosity of the formulation is applicable for 3D printing of the polishing layer. The formulation may have a viscosity for ejection of the formulation through a 3D printing ejection nozzle. The viscosity may be less than 20 cP at 70° C. The viscosity may be in the range of 10 cP to 20 cP at a temperature of 70° C.

Another implementation is a method of synthesizing a urethane acrylate oligomer for additive manufacturing of a polishing pad. The method includes selecting a difunctional polyol or difunctional polythiol to affect a property (e.g., elongation at break, UTS, storage modulus, glass transition temperature, or melting point) of a polishing layer of the polishing pad. The difunctional polyol may be a semi-crystalline polyester, a polycarbonate, or a polyethylene, and the like. The difunctional polythiol may be the corresponding difunctional polythiol. The difunctional isocyanate may be, for example, a diisocyanate. To affect the property may involve selecting the difunctional polyol or the difunctional polythiol to meet a specified numerical range of the property. In certain instances, to affect the property may be to increase elongation property or UTS of the polishing layer. The method may include correlating multiple difunctional polyols including the difunctional polyol with the property or correlating multiple difunctional polythiols including the difunctional polythiol with the property. The method may further include selecting the difunctional polyol or the difunctional polythiol so to affect viscosity (e.g., decrease viscosity or to meet a specified numerical range) of a 3-D printing formulation having the urethane acrylate oligomer. The selection may be so that the viscosity is below a maximum value (e.g., 20 cP) as ejected through a 3D printer nozzle in the additive manufacturing.

The method includes performing a catalytic reaction (e.g., polymerization) of the difunctional polyol or the difunctional polythiol with a difunctional isocyanate to give a urethane oligomer (e.g., as a prepolymer). One example of the catalyst is DBTDL. The method includes capping the urethane oligomer with an acrylate (e.g., 2-hydroxyethyl acrylate) to give the urethane acrylate oligomer (e.g., as a UV curable oligomer). The urethane acrylate oligomer as applied in the additive manufacturing affects the property. The urethane acrylate oligomer as applied may include the urethane acrylate oligomer subjected to ultraviolet (UV) light to cure or crosslink the urethane acrylate oligomer. The urethane acrylate oligomer as applied may involve the urethane acrylate oligomer subjected to photopolymerization.

Yet another implementation relates to a method of synthesizing a urethane acrylate oligomer (e.g., a UV curable oligomer) for additive manufacturing of a polishing pad. The method includes choosing a difunctional polyol or difunctional polythiol to affect a viscosity of a 3D printing formulation having the urethane acrylate oligomer in the additive manufacturing and to affect a property of a polishing layer of the polishing pad. The property may be elongation at break, UTS, storage modulus, glass transition temperature, or melting point, or any combinations thereof. To affect the viscosity may be to give the viscosity of the 3D printing formulation less than 20 cP. The method includes reacting in presence of catalyst the difunctional polyol or the difunctional polythiol with a difunctional isocyanate to give a urethane oligomer prepolymer. The method includes incorporating an acrylate as end caps on the urethane oligomer prepolymer to give the urethane acrylate oligomer, wherein the urethane acrylate oligomer in the additive manufacturing affects the property.

Yet another implementation is a method of fabricating a polishing pad, such as a CMP pad. The method includes injecting a formulation having a urethane acrylate oligomer through a nozzle (e.g., 3D printer nozzle) to form a polishing layer of the polishing pad. In some instances, the formulation may have a viscosity in a range of 10 cP to 20 cP at a temperature of 70° C. for ejection of the formulation through the nozzle. The formulation may also include monomer (e.g., acrylic monomer), an additive, and a photointiator. In certain examples, component concentrations in the formulation may be the urethane acrylate oligomer less than 35 wt %, the monomer greater than 60 wt %, and photoinitiator less than 5 wt %. The urethane acrylate oligomer is a urethane oligomer end-capped with an acrylate. The urethane oligomer is based on a difunctional polyol and a difunctional isocyanate or based on a difunctional polythiol and the difunctional isocyanate. The urethane oligomer may be a product of a catalytic reaction of the difunctional polyol and the difunctional isocyanate, or a product of a catalytic reaction of difunctional polythiol and the difunctional isocyanate. The method includes applying light to the formulation to cure the urethane acrylate oligomer as injected, wherein the difunctional polyol or difunctional polythiol are selected to affect a property of the polishing layer, and wherein the difunctional polyol or difunctional polythiol may be additionally selected to decrease viscosity of the formulation. The property may be elongation, UTS, or storage modulus. To affect the property may be to satisfy a minimum value of the property. To affect the property may be to meet a specified numerical range of the property.

A number of implementations have been described. Nevertheless, it will be understood that various modifications may be made without departing from the spirit and scope of the disclosure. For example, either the polishing pad, or the carrier head, or both can move to provide relative motion between the polishing surface and the substrate. The polishing pad can be a circular or some other shape. An adhesive layer can be applied to the bottom surface of the polishing pad to secure the pad to the platen, and the adhesive layer can be covered by a removable liner before the polishing pad is placed on the platen. In addition, although terms of vertical positioning are used, it should be understood that the polishing surface and substrate could be held upside down, in a vertical orientation, or in some other orientation. Accordingly, other implementations are within the scope of the following claims.

What is claimed is:

1. A method of manufacturing a polishing pad, comprising:
correlating multiple difunctional polyols with a property of a polishing layer of the polishing pad, wherein the property comprises ultimate tensile strength (UTS), storage modulus, glass transition temperature, or melting point, or any combinations thereof, wherein the multiple difunctional polyols comprise linear aliphatic polyester polyols;
selecting a difunctional polyol that is a linear aliphatic polyester polyol of the multiple difunctional polyols to affect the property of the polishing layer of the polishing pad to give a specified value of the property;
performing a catalytic reaction of the difunctional polyol as selected with a difunctional isocyanate to give a urethane oligomer;
capping the urethane oligomer with an acrylate to give a urethane acrylate oligomer, wherein the urethane acrylate oligomer as applied in additive manufacturing of the polishing pad affects the property to give the specified value; and
performing the additive manufacturing including injecting a formulation through a three dimensional (3D) printer nozzle to form the polishing layer of the polishing pad, the formulation comprising 15 weight percent (wt %) to 25 wt % of the urethane acrylate oligomer and 70 wt % to 80 wt % of an acrylic monomer, wherein the polishing layer comprises a storage modulus at 90° C. in a range of 100 megapascal (MPa) to 300 MPa, and wherein the polishing pad comprises a chemical-mechanical planarization (CMP) pad.

2. The method of claim 1, wherein the acrylic monomer comprises multiple acrylic monomers, and wherein the urethane oligomer comprises a prepolymer, and wherein the urethane acrylate oligomer comprises an ultraviolet (UV) curable oligomer.

3. The method of claim 1, wherein the linear aliphatic polyester polyol comprises a semi-crystalline polyester.

4. The method of claim 1, wherein the difunctional isocyanate comprises a diisocyanate, and wherein the acrylic monomer comprises N,N-diethylacrylamide.

5. The method of claim 1, wherein correlating multiple difunctional polyols with the property comprises synthesizing a urethane acrylate oligomer from a difunctional polyol of the multiple difunctional polyols, incorporating the urethane acrylate oligomer as synthesized into a test formulation comprising monomer and a photoinitiator, curing the test formulation to give a cured formulation, and measuring the property of the cured formulation.

6. The method of claim 1, wherein a catalyst in the catalytic reaction comprises dibutyltindilaurate (DBTDL), and wherein the catalytic reaction comprises polymerization.

7. The method of claim 1, wherein the acrylate comprises 2-hydroxyethyl acrylate.

8. The method of claim 1, wherein the property comprises UTS or storage modulus, and wherein to affect the property comprises to increase the UTS or the storage modulus.

9. The method of claim 1, wherein to affect the property comprises selecting the difunctional polyol to meet the specified value as a specified numerical range of the property.

10. The method of claim 1, wherein the formulation comprises a viscosity in a range of 10 centipoise (cP) to 20 cP at a temperature of 70° C. for ejection of the formulation through the 3D printer nozzle, and wherein the urethane acrylate oligomer as applied comprises the urethane acrylate oligomer subjected to UV light to cure or crosslink the urethane acrylate oligomer.

11. The method of claim 1, wherein the difunctional polyol is selected to decrease viscosity of the formulation, wherein the formulation comprises photoinitiator less than 5 wt %, and wherein the urethane acrylate oligomer as applied comprises the urethane acrylate oligomer subjected to photopolymerization.

12. The method of claim 1, wherein selecting the difunctional polyol further comprises selecting the difunctional polyol to decrease viscosity of the formulation comprising a three dimensional (3D) printing formulation comprising the urethane acrylate oligomer.

13. The method of claim 1, wherein selecting the difunctional polyol further comprises selecting the difunctional polyol to meet a specified numerical range of viscosity of the formulation comprising a 3D printer formulation comprising the urethane acrylate oligomer.

14. The method of claim 1, wherein selecting the difunctional polyol further comprises selecting the difunctional polyol such that viscosity of the formulation comprising the urethane acrylate oligomer is below a maximum value.

15. The method of claim 14, wherein the maximum value of the viscosity of the formulation as ejected through the 3D printer nozzle in the additive manufacturing comprises 20 centipoise (cP) as measured at 70° C.

16. A method of additive manufacturing of a polishing pad, comprising:
choosing a difunctional polyol comprising a linear aliphatic polyester polyol to affect a viscosity of a three dimensional (3D) printing formulation having urethane acrylate oligomer and to affect a property of a polishing layer of the polishing pad, wherein the property comprises ultimate tensile strength (UTS), storage modulus, glass transition temperature, or melting point, or any combinations thereof;
reacting in presence of catalyst the difunctional polyol with a difunctional isocyanate to give a urethane oligomer prepolymer;
incorporating an acrylate as end caps on the urethane oligomer prepolymer to give the urethane acrylate oligomer, wherein the urethane acrylate oligomer affects the property;
preparing the 3D printing formulation comprising 15 wt % to 25 wt % of the urethane acrylate oligomer and 70 wt % to 80 wt % of acrylic monomer; and
injecting the 3D printing formulation through a 3D printer nozzle, thereby forming the polishing layer of the polishing pad, wherein the polishing layer comprises a storage modulus at 90° C. in a range of 100 megapascal (MPa) to 300 MPa, wherein the polishing pad comprises a chemical-mechanical planarization (CMP) pad.

17. The method of claim 16, wherein to affect the viscosity comprises to give the viscosity of the 3D printing formulation less than 20 centipoise (cP) as measured at 70° C., and wherein the 3D printing formulation comprises photoinitiator less than 5 wt %.

18. The method of claim 16, wherein the urethane acrylate oligomer comprises an ultraviolet (UV) curable oligomer, and wherein the acrylic monomer comprises N,N-diethylacrylamide.

* * * * *